United States Patent Office 2,718,437
Patented Sept. 20, 1955

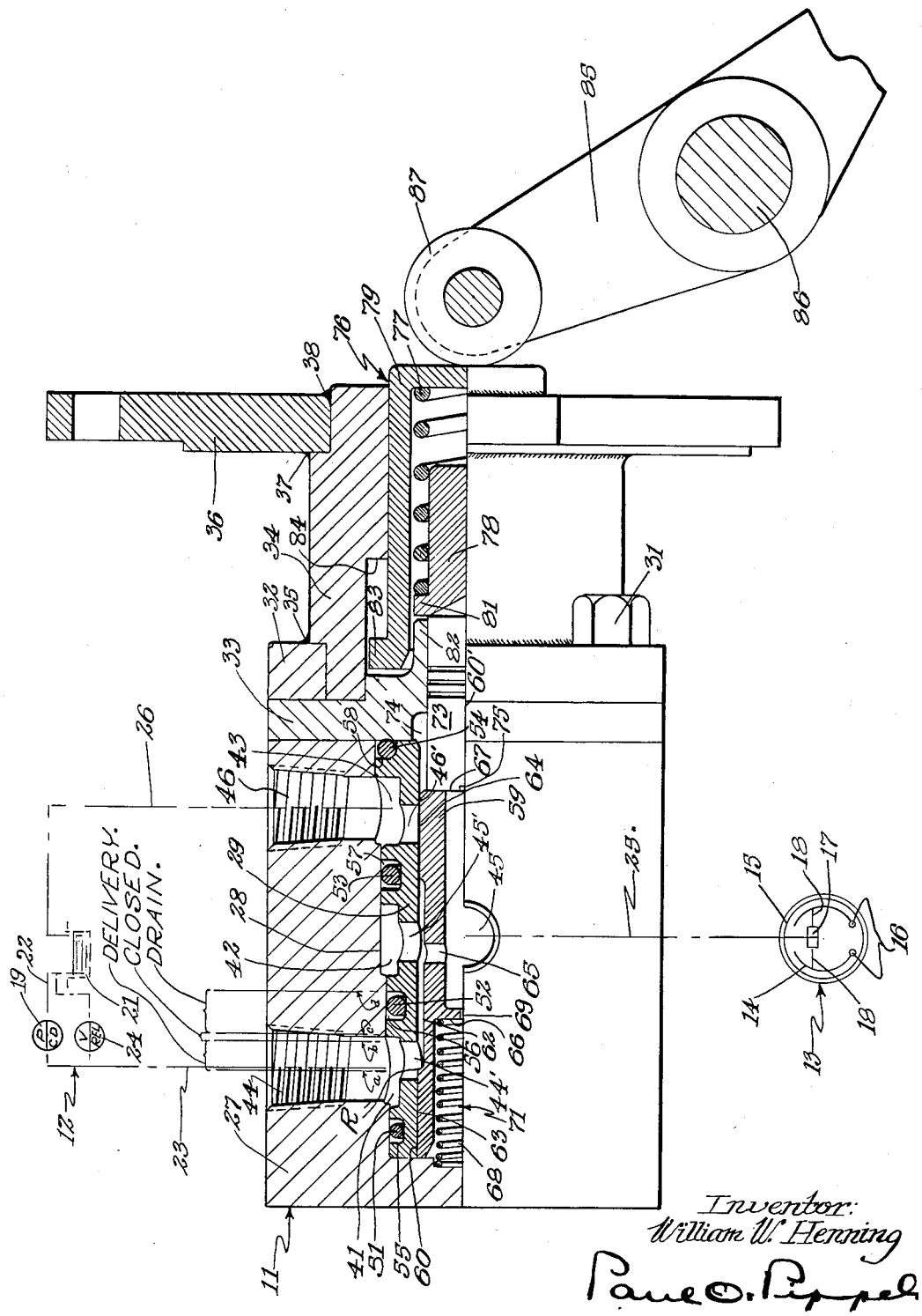

2,718,437

FLUID PRESSURE CONTROL VALVE

William W. Henning, Prospect Heights, Ill., assignor to International Harvester Company, a corporation of New Jersey Continuation of abandoned application Serial No. 95,559, May 26, 1949. This application February 2, 1955, Serial No. 485,684

9 Claims. (Cl. 303—54)

This invention has to do with pressure controlling valves, and more particularly concerns a valve selectively adjustable for admitting fluid under pressure to a place of delivery to create therein a pressure correlated with the valve setting. This application is a continuation of my application Serial No. 95,559 filed May 26, 1949, titled Fluid Pressure Control Valve, now abandoned.

A valve constructed in accordance with this invention is well adapted for use in a fluid line between a source of pressure fluid and a brake actuating pulsator for controlling admission of fluid into the pulsator for applying the brake with a force proportional to the distance a control element of the valve is advanced. A valve of this general character is illustrated in U. S. Patent 1,812,269, issued June 30, 1931, to Ernest G. McCauley.

Prior art valves of the type upon which the present valve is an improvement have comprised a port-controlling plunger advanceable into a port-opening position establishing communication between a source of fluid under pressure and the brake actuating pulsator by force transmitted through a compressible spring and retractable incident to compressing the spring in accordance with the increase of pressure in the fluid admitted to the brake actuating pulsator so the magnitude of fluid pressure in the pulsator is proportional to the compression of the spring. Manually controlled relaxation of the spring in these prior art valves accommodates further retractive movement of the valve plunger from a port-closing position to a "drain" or pressure-relieving position permitting exhaust of fluid from the brake actuating pulsator through the valve to a place of low pressure so that the valve is capable of manipulation to diminish pressure applied to the brake as well as to increase pressure applied thereto. For these valves to be as sensitive as desired, a valve closing position between the delivery position and the drain position has had a narrow range of movement and consequently the valve plunger has been subject to overtravel from the fluid-delivery position to the "drain" position at times when the pressure has been built up quickly in the brake actuating pulsator. This causes the valve to exhaust fluid from the pulsator and subsequent to this exhaust of fluid the compressed spring will again force the valve plunger into the delivery position which is followed by overtravel into the exhaust position, and so on. This "hunting" of the valve plunger sometimes takes place at high frequency developing a chattering noise in the valve and subjecting the fluid system to destructive hydraulic hammering.

The primary object of this invention is the provision of a pressure controlling valve employing a port controlling plunger advanceable into the fluid delivery position by force received from an advanceable means which is separably retractable from the valve plunger responsively to an increase of pressure in the brake actuating pulsator. This arrangement enables the port controlling plunger to retract into the valve-closing position independently of the fluid pressure and therefore at a regulated speed avoiding overtravel into the "drain" or pressure-relieving position. Such a valve does not cause hydraulic hammer.

Another general object is the provision of an improved pressure controlling valve of simplified structure wherein there is motion retarding means for the port-controlling plunger as further assurance against overtravel of this plunger under the force of hydraulic pressure and/or the inertia of the plunger.

A further object is the provision of a valve selectively adjustable for predetermining the pressure of fluid delivered therethrough and wherein there is dampening means operable to diminish the retractive movement rate of a port-controlling plunger advanceable under force received from a valve operator retractable therefrom.

These and other desirable objects inherent in and encompassed by the invention will be more readily comprehended from the ensuing description, the appended claims and the annexed drawings wherein:

The single drawing figure is a side elevational view, partly in longitudinal section, of a valve embodying a preferred form of the invention, together with diagrammatically illustrated fluid circuit connections.

In the drawing the valve unit 11 therein shown is adapted to control the flow of fluid from a diagrammatically shown pressure source 12 to a diagrammatically shown brake device 13 for applying friction shoes 14 of this device against a brake drum 15 thereof. These brake shoes are mounted upon fixed pivots 16 and are caused to engage the inner periphery of the drum 15 when a hydraulically operated pulsator 17 is actuated by the introduction of fluid therein for exerting thrust through struts 18 against the brake shoes. The pressure source 12 includes a constantly driven pump 19 which draws fluid from a sump 21 through a conduit 22 and maintains pressure in a conduit 23 leading to the valve unit 11. A by-pass valve 24 is connected between the conduits 23 and 22 for allowing the pump 19 to by-pass when there is no delivery of fluid through the conduit 23. Fluid entering the valve unit 11 through the conduit 23 is delivered to the brake actuating pulsator 17 through a conduit 25. When the pulsator 17 is deenergized for releasing the brake, reversely flowing fluid through the conduit 25 is directed by the valve unit through a drain conduit 26 back to the sump 21.

A casing of the valve unit includes a housing element 27 containing a stepped bore 28. A centrally bored removable casing element 29 is inserted into the bore 28 where it is held by a circle of bolts 31 (one being shown) which reach through a flange 32 and an end wall 33 into threaded recesses (not shown) in the right end of the casing element 27. The casing is supported upon a sleeve 34 with which the flange is fabricated by welding at 35, the sleeve 34 having a large diameter mounting flange 36 secured to its outer end by circular weld lines 37 and 38.

There are three axially spaced grooves 41, 42 and 43 about the outer cylindrical periphery of the cylindrical valve casing element 29. A tapped inlet hole 44 communicates through the casing element 27 with the groove 41 whereas a tapped delivery hole 45 communicates through the casing element 27 with the groove 42 and a tapped "drain" or pressure-release hole 46 communicates through the casing element 27 with the groove 43. Coupling elements (not shown) are adapted to be screwed respectively into the holes 44, 45 and 46 to facilitate attachment of the conduits 23, 25 and 26 thereto. A plurality of circumferentially spaced inlet ports 44' (one being shown) communicate through the casing element 29 between the groove 41 and the interior of such element, whereas a plurality of similar circumferentially spaced ports 45' (one being shown) communicate between the groove 42 and the interior of such element 29 and a plurality of similar ports 46' (one being shown) communicate between the groove 43 and the interior of said element 29. The grooves 41, 42 and 43 are communicatively isolated from one another and from the ends of the casing by O-rings 51, 52, 53 and 54 respectively in grooves 55, 56, 57 and 58 circumscribing the casing element 29.

A tubular valve plunger 59 is slidable endwise in a casing bore 60 contained in the casing element 29. A broad circumferential groove 62 circumscribing the plunger 59 at a central portion leaves lands 63 and 64 at opposite ends of the plunger. A port 65 extends radially through the plunger wall at a position between a transverse wall 66 thereof and an open end 67 of such plunger. Biasing means in the form of a spring 68 biases the plunger 59 endwise to the right as viewed in the drawings. Said transverse wall 66 together with a breather opening 69 therein constitute motion retarding means limiting the rate at which a breather chamber 71 formed between the left end wall of the bore 60 and said wall 66 is fillable with fluid from the right-hand part of the tubular plunger 59, and thereby controls the speed at which the plunger can move.

A reduced diameter right end portion 60' of the bore 60 formed in the casing end wall 33 slidably contains a piston 73. This piston is in separable engagement with the right end of the valve plunger 59. An annular breather chamber 74 is formed about the piston 73 and between the casing end wall 33 and the right end of the valve plunger, and a breather passage in the form of a diametric slot 75 in the left end of the piston provides communication between the breather chamber 74 and the interior of the tubular valve plunger.

An elastic force-transmitting unit 76 for controlling the axial position of the valve plunger 59 includes a helical spring 77 disposed between a force-imparting element 78 and a manually advanceable control member 79. Advancement of the force-imparting element 78 to the left is limited by the abutment of a flange 81 thereon with the end of a flange 82 on the casing end wall 33. Retraction of the manually advanceable control member 79 is limited by a flange 83 thereon abutting against a shoulder 84 in the mounting sleeve 34. The axial position of the control member 79 within the sleeve 34 is selectively determinable by pivoting a control lever 85 about a fixed pivot 86 to determine the pressure of a roller 87 upon the outer end of said member 79.

*Operation of the apparatus*

It will be assumed that the pump 19 is operating so the source 12 of pressure fluid will be energized to impress fluid under pressure through the conduit 23 into the ports 44—44'. It will also be assumed that the lever 85 is rotated clockwise to allow expansion of the springs 77 and 68 wherefore the control member 79 will be retracted with its flange 83 against the shoulder 84. With the parts in this adjustment the shoulder R at the left end of the groove 62 circumscribing the valve plunger 59 will register with the right end $d$ of a range $c$—$d$ designated "drain." While the valve plunger is in this position the land 63 will cover the radial inner ends of the ports 44', and the circumferential groove 62 about the valve plunger will be communicative with the delivery port 45 and with the pressure-release or "drain" ports 46' so the fluid from the brake actuating pulsator 17 can be displaced through the conduit 25, port 45, valve plunger groove 62, ports 46'—46 and the conduit 26 to the sump 21, allowing disengagement of the brake 13.

When it is desired to engage the brake 13 the lever 85 will be pivoted counter-clockwise to advance the manually advanceable control member 79 to the left, compressing the spring 77 to advance the force-imparting element 78 and the piston 73 to the left. This, pursuant to compressing the spring 68, shifts the adjustable valve element 59 through the range $c$—$d$ (traversed by the reference point R constituted by the annular shoulder at the left end of the valve plunger groove 62) for causing the valve plunger land 64 to close the ports 46'. The valve will then be adjusted into a "closed" position wherein the delivery port means 45—45' will be communicative with neither the inlet port means 44—44' nor the drain port means 46—46'. This closed condition of the valve will prevail while the reference point R on the valve plunger is in the "closed" range $b$—$c$. Advancement of the elastic force-transmitting unit 76 far enough for advancement of the reference point R into the "delivery" range $a$—$b$ will establish communication between the inlet port means 44—44' and the delivery port means 45—45' while leaving the land 64 in closing relation with respect to the drain port means 46—46'. When the operator has advanced the manually advanceable control member 79 a distance corresponding to the firmness with which he desires the brake 13 to be applied he will hold such member 79 at that advanced position pursuant to which the valve plunger will have established communication between the inlet port means 44—44' and the delivery port means 45—45'. This "delivery" condition of the valve is but momentary, however, because as soon as the brake actuating pulsator 17 applies the brake shoes 14 against the brake drum 15 with the desired pressure, back pressure within the conduit 25, the delivery port means 45—45', groove 62, port 65 and the interior of the tubular valve plunger will exert an increasing pressure upon the piston 73 forcing it and the force-imparting element 78 retractively to the right incident to compressing the spring 77. When this occurs the spring 68 will cause the plunger 59 to follow the elements 78 and 73 until the reference shoulder R on the plunger retracts into the closed range $b$—$c$ whereupon the plunger land 63 covers the inlet ports 44'. The brake will then continue to be applied with this predetermined pressure so long as the manually advanceable control member 79 is held against retraction. Should the operator desire to increase the force with which the brake 13 is applied he will further advance the control member 79 for shifting the parts 78, 73 and 59 to the left against the force of spring 68 to again uncover the inlet ports 44'. As soon as this occurs fluid flowing serially through the ports 44' and that part of the bore 60 registering with the groove 62 of the valve plunger and thence through the delivery port means 45—45' will increase the pressure in the brake-applying pulsator 17 for increasing the frictional engagement between the brake elements 14 and 15. As the pressure in the pulsator unit 17 increases correspondingly to an increase in pressure of the fluid communicative with the delivery port means 45—45', the piston 73 and the force-imparting element 78 will again be retracted. When the pressure of this fluid reaches a magnitude sufficient for compressing the spring 77, the spring 68 causes the valve plunger 59 to follow this retractive movement of the piston 73 and of the force-imparting element 78 for again terminating communication between the inlet port means 44—44' and the delivery port means 45—45'. Because of the separable association of the force-imparting element 78 with the valve plunger 59 through the piston 73, any surge-like increase of pressure in the valve plunger bore against the piston 73 can cause the piston and the element 78 to move retractively without immediate retraction of the valve plunger. This plunger can then retract in dampened fashion at a slower speed determined by the strength of the spring 68 and the size of the breather passage 69 which admits fluid from the right end of the plunger bore into the breather chamber 71 as the plunger retracts. The plunger bore and the separable force-transmitting relation between the valve element 59 and the elastic force-transmitting unit 76 constitue means operable responsively on an increase in pressure of the fluid communicative with the delivery port 45 to retract the force-imparting means or element 78.

This operating feature permitting retraction of the force-imparting element 78 without simultaneous retraction of the valve-plunger 59 eliminates valve chatter which has been present in the prior art valves. If, as in the case of prior art valves, the force-imparting element 78 and the valve plunger 59 were rigidly inter-connected, sudden pressure increase of fluid communicative through the delivery port 45 with the interior of the valve bore for moving the valve plunger to the closed position incident to the pressure at the brake actuating pulsator obtaining the desired value, inertia of the axially movable parts including the valve plunger would cause said plunger to be carried past the "closed" position into the "drain" position so there would be discharge of fluid from the brake actuating pulsator through the drain passage means 46—46'. This pressure diminution of fluid communicative with the delivery port 45 and the interior of the valve plunger bore would enable the over-stressed spring 77 to advance the plunger into the delivery position again and this would be followed by a succeeding impulse of fluid pressure in the brake-actuating pulsator and a succeeding over-travel of the valve plunger to again cause communication between the pulsator and the drain passage. Such vibratory motion of the valve plunger would cause the noisy and destructive hydraulic hammer in the entire hydraulic circuit. In the present valve where the pressure of fluid introduced into the brake-actuating pulsator is effective only for retracting the piston 73 and the force-imparting element 78 so the valve plunger 59 can retract into re-engagement with the piston 73 under the force of spring 68 in dampened fashion by the motion retarding means 66—69—71, there is no over-travel of the valve plunger although the spring 68 can be made sufficiently strong to cause essentially instantaneous closing of the valve when the force-transmitting element 78 is retracted. While the piston is retracted to the right from the right or trailing end of the valve plunger 59, the bore in such plunger and a portion of the side wall of the casing bore 60 immediately to the right of the plunger 59 comprise fluid column confining means communicative with the delivery port 45 and maintain the fluid column therein captive so there will be fluid pressure leftward on the plunger 59 to prevent inordinately rapid movement thereof to the right by the biasing means 68.

In addition to the breather chamber 71 there is also the breather chamber 74 and its breather port 75 for retarding motion of the valve plunger. The breather chamber 74 together with that portion of the casing bore 60 rightward from the trailing right end of the tubular plunger 59 constitutes a fluid accumulating chamber which expands attendant to retraction of the piston 73 from the right end of the plunger to receive and temporarily store fluid forced thereinto from the tubular plunger by the impulse of increased fluid pressure transmitted back through the fluid line 25. In this manner this fluid accumulator chamber absorbs the shock wave of the pressure impulse and returns the received fluid back into the plunger bore pursuant to contraction of such chamber as the opposed ends of the plunger and piston 73 subsequently reengage.

When the operator desires to release the brake he will release all manually applied pressure from the outer end of the control member 79, diminishing stress in the spring 77 and allowing fluid pressure acting upon the left end of the piston 73 and the force of the spring 68 acting through the valve plunger upon the left end of the piston 73 to retract the elastic force-transmitting unit 77—78—79. The valve plunger 59 being thus moved into the drain range c—d by the spring 68 establishes communication of the brake actuating pulsator 17 through the valve port means 45—45' and 46—46' with the sump 21.

Should the operator desire to only partially release the brake he will only allow a corresponding partial retraction of the manually advanceable control member 79 which allows partial relaxation of the spring 77 so that the pressure of fluid applied to the brake and acting upon the left end of the piston 73 can prevail over the diminished force of the spring 77 for moving the elements 73 and 78 to the right and permit the valve plunger 59 to be moved retractively by the spring 68 into the drain position. As the fluid escapes from the interior of the valve plunger through the port 65 and the drain port means 46—46', the partially compressed spring 77 will be operable pursuant to the diminution of pressure on the inner end of the piston 73 for returning the valve plunger to the closed position coincidentally with the brake being applied with the desired diminished force.

Having thus described a single preferred form of the invention with the view of clearly and concisely illustrating the same, I claim:

1. In a valve structure for controlling the flow of fluid from a source of fluid under pressure to a place of delivery at selectable diminished pressure, a valve casing structure having an inlet port for communication with said source, a drain port for communication with a low pressure fluid receiver and a delicery port for communication with said place of fluid delivery, a valve-port-controlling element advanceable from a drain position wherein said element establishes communication between the delivery port and the drain port through a pressure-holding position wherein said element precludes intercommunication between any of said ports and into a fluid-delivering position wherein communication is established between the inlet port and the delivery port, an elastic force-transmitting unit including a force-receiving section and a force-imparting section disposed in force-importing relation with said valve element and advanceable to advance said element responsively to an increase of force applied to the force-receiving section of such unit, said force-imparting section of the unit being retractable responsively to an increase of reactive force thereon and also being retractable independently of said valve element, means biasing said valve element retractively toward said force-imparting section of the unit to apply a retractive force thereto, means sensitive to the pressure of fluid communicative with the delivery port for exerting a reactive force upon said force-imparting section for retracting the same into a position accommodating retraction of the valve element from the fluid delivery position to the pressure-holding position incident to distorting said elastic unit while the force-receiving section thereof is at rest, and motion-retarding means operable upon said valve element for limiting the speed at which it can retractively follow said force-applying section under the influence of said biasing means.

2. In a valve having an inlet port, a delivery port and a drain port and comprising an element adjustable in one direction from a "closed" position precluding communication between any of said ports to a "delivery" position establishing communication between the inlet and delivery ports and adjustable in the other direction from said "closed" position into a "drain" position establishing communication between the delivery port and the drain port, means biasing said valve element in said opposite direction toward the "drain" position, an elastic force-transmitting unit including a force-receiving element and a force-imparting element disposed in force-imparting relation with said valve element and advanceable to advance said element in the one direction responsively to an increase of force applied to the force-receiving section of such unit, said force-imparting element of the unit being retractable responsively to an increase of reactive force thereon and also being retractable independently of said valve element, means sensitive to the pressure of fluid communicative with the delivery port for exerting a reactive force upon said force-imparting element for retracting the same into a position accommodating retraction of the valve element from the "delivery" position under the influence of said biasing means incident to distorting said elastic unit while the force-receiving element thereof is at rest, and motion-retarding means operable upon said valve element for limiting the speed at which it can retractively follow said force-imparting element under the influence of said biasing means.

3. In a valve for controlling the flow of fluid from a source of fluid under pressure to a place of delivery at selectable diminished pressure, a casing containing a valve-plunger-receiving bore, an inlet port communicative between said bore and said source, a drain port communicative with said bore and a delivery port communicative between the bore and said place of fluid delivery, a valve plunger reciprocally in said bore, said valve plunger being advanceable axially of said bore from a drain position establishing communication between the delivery port and the drain port, through a closed position obstructing intercommunication between any of said ports and thence into a delivery position establishing communication between the inlet port and the delivery port, a force-imparting element movable axially of said bore, a manually advanceable control member, a spring interposed between said control member and said force-imparting element for urging said element to advance axially of the casing bore with a force correlated with the degree of compression of said spring, a biasing spring reacting against said valve plunger urging the same retractively into force-transmitting relation with said force-imparting element, said force-imparting element being advanceable axially of the bore for advancing the valve plunger against the force of the biasing spring and being retractable independently of such plunger, means for imposing the pressure of fluid at the delivery port upon said force-imparting element to retract the same and compressing said interposed spring pursuant to a pressure increase in fluid at the delivery port while the valve plunger is in the delivery position, and means for dampening retraction of the valve plunger to limit the speed with which the plunger can retract with the force-imparting element.

4. In a valve having an inlet port and a delivery port through which fluid is serially flowable and comprising an element adjustable in one direction from a "closed" position precluding communication between said ports to an "open" position establishing communication between said ports, means biasing the valve element oppositely from the "open" position toward the "closed" position, means advanceable for imparting force to the valve element to adjust the same into the "open" position and being retractable from such valve element to accommodate adjustment thereof toward the "closed" position under the influence of the biasing means, fluid column confining means communicative with said delivery port and including a breather chamber through which the retractively-advanceable force-imparting means projects into force-imparting relation with the valve element, said force-imparting means being operable responsively to an impulse of increased pressure in the fluid at such port and in such column to retract from the valve element into the breather chamber to increase the capacity of such chamber for accommodating an expansion of the fluid column and thus absorb the pressure impulse in pressure of fluid at such port and in such column attendant to maintaining such column captive, and motion retarding means for limiting the rate of such adjustment of the valve element into the "closed" position.

5. In a valve, a casing structure containing a valve-plunger-receiving bore, an inlet port communicative with said bore and a delivery port communicative with said bore wherefore fluid is serially flowable through said ports and bore, a valve plunger reciprocally in said bore, said plunger being advanceable axially in the bore from a closed position precluding communication between said ports to an open position establishing communication between said ports, means biasing the plunger retractively from the open position toward the closed position, a breather chamber disposed between the end of the plunger which trails when the plunger is advanced and a corresponding end of the casing bore wherefore such chamber is expanded when the plunger is advanced, means projecting through the breather chamber endwise against the plunger and advanceable for imparting force to the plunger to advance the same into the open position and being retractable from the plunger to expand such chamber and accommodate retraction of the plunger into the closed position under the influence of the biasing means, fluid column confining means comprising said breather chamber and an axial bore in said valve plunger communicative with said delivery port and operable responsively to an impulse of increased pressure in the fluid at such port and in such column to retract said advanceable means and expand the breather chamber for absorbing the pressure impulse while maintaining such column captive, and means for dampening retraction movement of the plunger.

6. In a valve, a casing structure containing a valve-plunger-receiving bore, an inlet port communicative with said bore and a delivery port communicative with said bore wherefore fluid is serially flowable through said ports and bore, a tubular valve plunger reciprocally in said bore, said plunger being advanceable axially in the bore from a closed position precluding communication between said ports to an open position establishing communication therebetween, said plunger having a side wall port communicating between the interior of the plunger and the delivery port and also having an end wall in opposed spaced relation with an end of the bore to form a pulsator chamber therebetween in said bore, a breather chamber comprising a portion of the side wall of the valve-plunger-receiving bore beyond and contiguous with the opposite end of the tubular plunger, advanceable means projecting through said breather chamber axially against the opposite end of the tubular plunger for imparting force thereto to advance the same into the open position incident to contracting the pulsator chamber, the advanceable means being retractable from the plunger to accommodate retraction of such plunger into the closed position, means biasing the plunger from the open position toward the closed position, said advanceable means being subjected to the pressure of fluid in the tubular plunger to be retracted thereby pursuant to an impulse of increased pressure in the fluid at the delivery port and within the plunger, the advanceable means being operable attendant to such retraction to increase the capacity of the breather chamber for receiving fluid from the tubular plunger and thus absorbing the pressure impulse while holding the fluid captive, and said end wall of the plunger containing a breather opening communicating between the pulsator chamber and the interior of the plunger to facilitate retractive motion of the plunger into the closed position under the influence of said biasing means but at a retarded rate constituting a function of the breather port flow capacity.

7. In a valve, a casing structure containing a valve-plunger-receiving bore, an inlet port communicative with said bore and a delivery port communicative with said bore wherefore fluid is serially flowable through said ports and bore, a tubular valve plunger reciprocally in said bore and having leading and trailing ends, said plunger being axially advanceable leading end foremost from a closed position precluding communication between said ports into an open position establishing such communication, said plunger being open at its trailing end and having a transverse wall axially spaced from the trailing end, the plunger having a side wall port communicative with the interior of the plunger between its transverse wall and the open trailing end and also communicative through the casing bore with the casing delivery port, a fluid accumulating chamber comprising a portion of the casing bore between the trailing end of the plunger and the corresponding end of such casing bore, a piston projecting through the accumulator chamber axially into separable contact with the trailing end of the valve plunger, compressible resilient means for imparting force through the piston to the plunger to advance the same into the open position and being compressible to facilitate retraction of the piston from the plunger responsively to an impulse of increased pressure of the fluid in the delivery port and in the tubular plunger upon the piston to increase the capacity of the accumulator chamber for receiving fluid from the plunger bore and thus absorbing the pressure impulse, means retractively biasing the plunger from the open position toward the closed position, and means for retarding the retraction rate of the plunger comprising a breather chamber formed between the outer side of the plunger transverse wall and an end wall of the casing bore adjacently to the leading end of the plunger.

8. A pressure controlling valve comprising a casing structure having a valve-plunger-receiving bore, an inlet port communicative with said bore and an outlet port communicative with said bore wherefore fluid is flowable serially through said ports and bore, a tubular valve plunger reversibly axially movable in said bore to control communication between said ports, said plunger being advanceable toward one end of the bore from a closed position precluding communication between the ports to an open position establishing such communication, a portion of the bore adjacently to the opposite end thereof being of less diameter than an intermediate portion thereof in which the plunger is disposed, a piston piloted in the less diameter end portion of the bore and advanceable into separatable force-imposing relation with the plunger for advancing it from the closed position into the open position, means biasing the plunger toward the closed position, the piston being retractable incident to separating from the plunger to accommodate retraction of the plunger under the influence of said biasing means, there being a pulsator chamber formed in the casing bore between the valve plunger and the reduced diameter section of the bore, and breather passage means communicating between said pulsator chamber and the interior of the valve plunger to accommodate retarded movement of the valve plunger by the biasing means.

9. The combination set forth in claim 8 wherein said piston has an end face engageable with an annular end face of said tubular valve plunger, and wherein said breather passage means includes a groove radially traversing at least one of said faces.

No references cited.